United States Patent [19]

Hall

[11] Patent Number: 6,122,057
[45] Date of Patent: Sep. 19, 2000

[54] FOUR STEP DISCRETE PHASE SHIFT DEMODULATION METHOD FOR FIBER OPTIC SENSOR ARRAYS

[75] Inventor: David B. Hall, La Crescenta, Calif.

[73] Assignee: Litton Systems, Inc., Woodland Hills, Calif.

[21] Appl. No.: 09/364,396

[22] Filed: Jul. 30, 1999

[51] Int. Cl.[7] .................................................. G01B 9/02
[52] U.S. Cl. .......................................... 356/345; 356/359
[58] Field of Search .................................... 356/345, 349, 356/359

[56] References Cited

U.S. PATENT DOCUMENTS 5,748,314   5/1998   Kitayoshi ................................ 356/345

OTHER PUBLICATIONS

I.J. Bush and D. R. Sherman, High Performance Interferomtric Demodulation Techniques, SPIE vol. 1795 Fiber Optic and Laser Sensors X, pp. 412–420, (1992) USA.

*Primary Examiner*—Robert H. Kim
*Attorney, Agent, or Firm*—Lynn & Lynn

[57] ABSTRACT

A sinusoidal phase generated carrier is used to demodulate signal output from an interferometric sensor array. Optical signals input to the array are modulated with a sinusoid. Output signals are sampled and integrated over portions of a period of the phase generated carrier. A key to this method of sampling is the existence of pairs of signals associated with integration over two 180° out-of-phase portions of the phase generated carrier. This invention is a four step method involves the implementation of two pairs of such signals to determine the phase shift in each sensor in the array.

6 Claims, 7 Drawing Sheets

FOUR STEP DISCRETE PHASE SHIFT DEMODULATION METHOD FOR FIBER OPTIC SENSOR ARRAYS

BACKGROUND OF THE INVENTION

This invention relates generally to signal processing techniques for fiber optic sensor systems. This invention relates particularly to demodulation of signals output from an array of fiber optic interferometric sensors for determining changes in a physical parameter measured by the individual sensors.

Mismatched fiber optic interferometers are commonly used as sensing elements in fiber optic sensor arrays for measuring changes in a parameter such as fluid pressure, acceleration, magnetic field intensity, etc. Such sensing elements measure the time-varying phase delay between two optical paths having unequal path length. Typically in time division multiplexed (TDM) systems, a modulated optical signal is input to the sensor array, and various demodulation techniques have been proposed for correlating signals output from the array with the sensors that produced the signals.

Common to all demodulation methods for fiber optic interferometric sensor arrays is the acquisition of an in-phase term proportional to the cosine of the interferometer phase shift and a quadrature term proportional to the sine of the interferometer phase shift. The sine of the sensor phase shift is referred to as the quadrature term, Q; and the cosine of the sensor phase shift is referred to as the in-phase term, I. The angle of the phase shift is determined by calculating ratio Q/I, which is the tangent of the sensor phase shift. The amplitudes of the sine and cosine terms must be set equal by a normalization procedure to ensure the successful implementation of an arctangent routine to find the sensor phase shift.

SUMMARY OF THE INVENTION

This invention provides a TDM demodulation method using a sinusoidal phase generated carrier that is easier to implement than previous methods. One sinusoidal voltage rather than a sequence of timed linear voltage ramps is applied to an external phase modulator. The sampling of signals is associated with integration over portions of a period of the phase generated carrier. A key to this method of sampling is the existence of pairs of signals associated with integration over two 180° out-of-phase portions of the phase generated carrier. This invention is a four step method involves the implementation of two pairs of such signals.

A method for demodulating signals output from a sensor array that includes a plurality of pathlength mismatched interferometers to determine phase shifts in optical signals that have propagated through the interferometers, comprises the steps of:

(a) providing an optical signal;
(b) modulating the optical signals with a sinusoidal modulation signal to produce a phase generated carrier having a period T;
(c) inputting the phase generated carrier to the sensor array;
(d) producing an output signal that indicates the phase shift for each interferometer in the array;
(e) generating an integrated output signal $S_1$ by integrating the output signal over a first integration time included in the period of the phase generated carrier;
(f) generating an integrated output signal $S_2$ by integrating the output signal over a time equal in duration to the first integration time and 180° apart therefrom in the period of the phase generated carrier;
(g) generating an integrated output signal $S_3$ by integrating the output signal over a second integration time included in the period of the phase generated carrier;
(h) generating a fourth integrated output signal $S_4$ by integrating the output signal over a time equal in duration to the second integration time and 180° apart therefrom in the period of the phase generated carrier; and
(i) processing the integrated output signals $S_1$, $S_2$, $S_3$ and $S_4$ to calculate the phase angle $\phi$.

An appreciation of the objectives of the present invention and a more complete understanding of its structure and method of operation may be had by studying the following description of the preferred embodiment and by referring to the accompanying drawings.

DETAILED DESCRIPTION OF THE INVENTION

Figure 1:
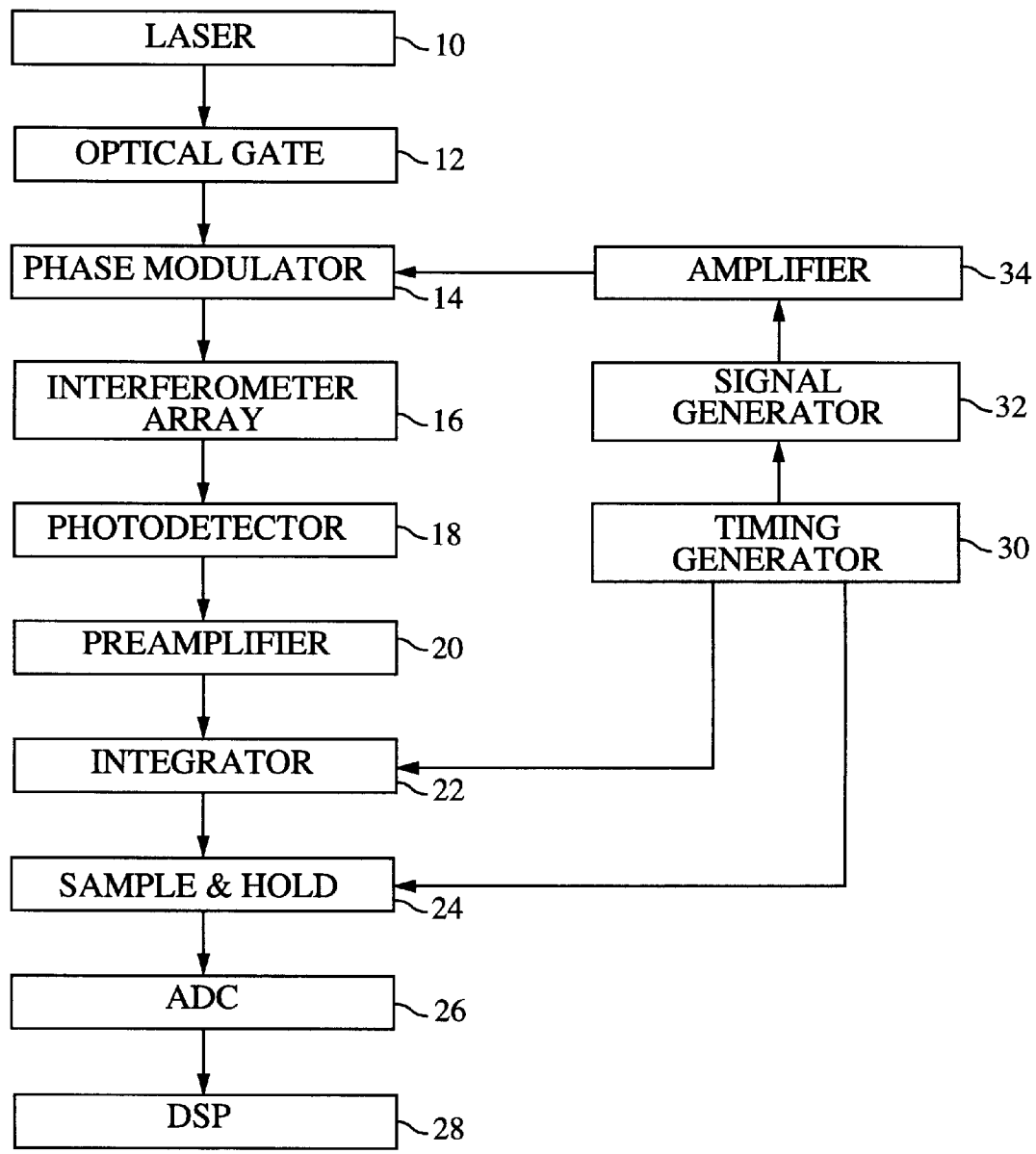
FIG. 1 is block diagram of a system for implementing the demodulation method according to the present invention for use with an interferometric sensor array.

As shown in FIG. 1, a laser 10 supplies an optical signal of fixed frequency ω through an optical gate 12 to a phase modulator 14. The optical gate 12 provides a pulsed optical signal. The phase modulated optical signal is input to a TDM interferometer array 16. TDM interferometric sensor arrays are well-known in the art and are therefore not described in detail here. For example, U.S. Pat. No. 5,917,597 issued Jun. 29, 1999 to David B. Hall and James S. Bunn, Jr. and assigned to Litton Systems, Inc. discloses a TDM fiber optic interferometric sensor array. The disclosure of U.S. Pat. No. 5,917,597 is incorporated by reference into the present disclosure. Each pulse input to the array 16 results in N return pulses, where N is the number of sensors in the array 16. Signals indicative of the interference pattern output by each interferometric sensor in the array 16 are sent in a serial fashion to a photodetector 18.

The photodetector 18 produces electrical signals corresponding to the sensor interference outputs. The photodetector output is input to a preamplifier 20 before being input to an integrator 22. The integrated signal is sampled by a sample and hold circuit 24, which provides the sampled signals to an analog to digital converter 26. The digitized signals are then input to a digital signal processor 28, which performs the calculations necessary to determine the phase shift $\phi$.

A timing generator 30 provides timing signals to a signal generator 32, which produces a sinusoidal signal. The output of the signal generator 32 is amplified by an amplifier 34, which provides the amplified sinusoidal signal to the phase modulator 14.

The timing generator 30 also provides timing signals to the integrator 22 and to the sample and hold circuit 24.

The digital signal processor 28 calculates the sine and cosine of the phase angle $\phi$ for each sensor in the array 16 and also calculates a normalization factor R needed to make the in phase and quadrature terms have the same amplitude.

The instantaneous output signal level of a mismatched interferometer with a phase generated carrier is given by $$s(t) = a + b\cos\left\{\varphi - \beta\sin\left(\frac{2\pi t}{T}\right)\right\} = a + e(t)\cos\varphi + o(t)\sin\varphi \quad (1)$$

where $$e(t) = b\cos\left\{\beta\sin 2\pi\left(\frac{t}{T}\right)\right\} \quad (2)$$

and $$o(t) = b\sin\left\{\beta\sin 2\pi\left(\frac{t}{T}\right)\right\}. \quad (3)$$

The average signal level is a, the interference signal level is b, and the desired interferometer phase shift is $\phi$. Quantities associated with the phase generated carrier are modulation depth $\beta$ and period T. The functions e(t) and o(t) are even and odd with respect to a translation of one half of a period T for the phase generated carrier. The symmetry properties of e(t) and o(t) yield the following result:

$$s\left\{t + (2n+1)\left(\frac{T}{2}\right)\right\} = a + e(t)\cos\varphi - o(t)\sin\varphi \quad (4)$$

where 2n+1=1, 3, 5, etc.

Sampling of the instantaneous signal levels s(t) and $$s\left\{t + (2n+1)\frac{T}{2}\right\}$$

requires integration over a portion of one period T of the phase generated carrier. The integration times for both signals should be exactly equal and on portions of a period of the phase generated carrier exactly 180° apart. In this case the sampled signals follow the same relationships to one another as the instantaneous signals shown above. Using capital letters to denote integrated outputs, we obtain $$S_1 = A + E_1\cos\phi + O_1\sin\phi \quad (5)$$

and $$S_3 = A + E_1\cos\phi - O_1\sin\phi \quad (6)$$

where $S_1$ is the integrated output of s(t) and $S_3$ is the integrated output of $$s\left\{t + (2n+1)\frac{T}{2}\right\}.$$

There is no limitation on the integration time except for the requirement that the two signals not overlap. There also is no limitation on the start time of the integration with respect to the period of the phase generated carrier.

$S_1$ and $S_3$ are the first pair of signals derived from sampling on portions of the period of the phase generated carrier 180° apart. Another pair of like signals can be generated on portions of the period of the phase generated carrier not occupied by $S_1$ and $S_3$.

$$S_2 = A + E_2\cos\phi + O_2\sin\phi \quad (7)$$

and $$S_4 = A + E_2\cos\phi - O_2\sin\phi \quad (8)$$

The average signal A is the same for all four integrated signals indicating one common integration time for all of them. If all four signals are adjacent to one another within one period T, then the numbering 1 through 4 indicating time of arrival means that the first signal pair $S_1$ and $S_3$ is interleaved with the second signal pair $S_2$ and $S_4$.

The following expressions for quadrature and in phase components of $\phi$ are derived from Eqs. (5) through (8).

$$Q = S_1 - S_2 - S_3 + S_4 = 2(O_1 - O_2)\sin\varphi = \frac{Q_{PP}}{2}\sin\varphi \quad (9)$$

and $$I = S_1 - S_2 + S_3 - S_4 = 2(E_1 - E_2)\cos\varphi = \frac{I_{PP}}{2}\cos\varphi \quad (10)$$

where $Q_{pp}$ and $I_{pp}$ are the maximum peak to peak variations in Q and I.

Eq. (9) may be divided by Eq. (10) to obtain $$\frac{Q}{I} = \left[\frac{O_1 - O_2}{E_1 - E_2}\right]\tan\varphi. \quad (11)$$

The ratio $(O_1-O_2)/(E_1-E_2)$ has to be determined for the successful implementation of the arctangent routine to find the phase shift $\phi$ in Eq. (1). This ratio, R, is obtained by using the improved normalization method, which looks at successive differences of $Q^2$ and $I^2$. The ratio R may be written as $$R = \left[\frac{O_1 - O_2}{E_1 - E_2}\right] = \frac{Q_{PP}}{I_{PP}}. \tag{12}$$

From Eqs. (9)–(12), the tangent of the phase change is calculated as $$\tan\varphi = \left[\frac{1}{R}\right]\left[\frac{Q}{I}\right]. \tag{13}$$

Tracking of phase shift (p is accomplished by taking the arctangent of Eq. (13) and counting over time the number of fringe cycles of $2\pi$ radians. The ratio $Q_{pp}$ to $I_{pp}$ is the normalization ratio needed for successful implementation.

Modeling of the algorithm has been performed on Math Cad with numbers compatible with a laboratory TDM test site currently using a sequence of three linear voltage ramps on the phase modulator. The clock cycle for the test site is 16.4 nanoseconds, and the period of the phase generated carrier is set at twenty clock cycles, which equal 328 nanoseconds, giving a phase generated carrier frequency of 1000/328=3.04878 MHz.

During one period there are four sampling intervals, each lasting two clock cycles of 32.8 nanoseconds and four spacing intervals with no signal sampling each lasting three clock cycles of 49.2 nanoseconds. The even and odd functions of the phase generated carrier with unity amplitude are $$e(t, T, \beta) := \cos\left(\beta\sin\left(\frac{2\pi t}{T}\right)\right) \tag{14}$$

and $$o(t, T, \beta) := \sin\left(\beta\sin\left(\frac{2\pi t}{T}\right)\right). \tag{15}$$

Figure 2:
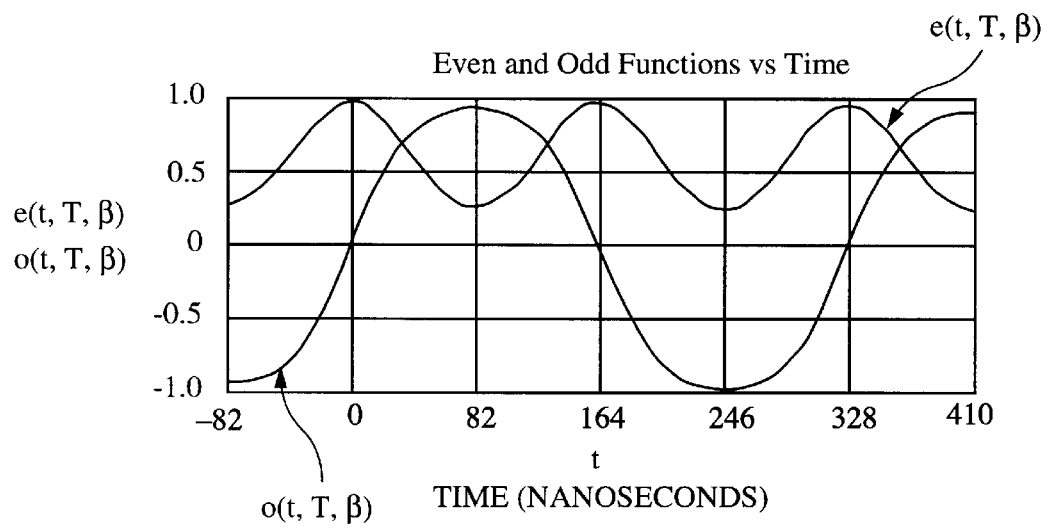
FIG. 2 graphically illustrates time variations of even and odd functions representing the signal output of an interferometric sensor array having a phase generated carrier input signal obtained by sinusoidal modulation of an optical signal.

A plot of these functions with modulation depth $\beta$ set to 1.3 radians and period T set to 328 ns is shown in FIG. 2.

Three cycles of the cosine-like even function and one and one half cycles of the sine-like odd function are shown. An interval of 82 nanoseconds represents the time of one sampling interval followed by one spacing interval with no signal sampling. A translation in time of 164 nanoseconds corresponding to T/2 produces no change in the even function and an inversion of the odd function.

The four sampling intervals consist of integrations over four separate portions of one period T of the even and odd functions shown in FIG. 2. The start time at which the first sampling interval begins is arbitrary. Let it be called $t_0$. The four integrated outputs $E_1$, $O_1$, $E_2$, and $O_2$ in Eqs. (5) through (8) become $$E_1(t_0, T, \beta) := \int_{t_0}^{t_0+32.8} e(t, T, \beta)dt, \tag{16}$$

$$O_1(t_0, T, \beta) := \int_{t_0}^{t_0+32.8} o(t, T, \beta)dt, \tag{17}$$

-continued $$E_2(t_0, T, \beta) := \int_{t_0+82}^{t_0+114.8} e(t, T, \beta)dt, \tag{18}$$

and $$O_2(t_0, T, \beta) := \int_{t_0+82}^{t_0+114.8} o(t, T, \beta)dt. \tag{19}$$

The intervals for $E_2$ and $O_2$ follow the intervals for $E_1$ and $O_1$ by T/4=82 ns. Peak to peak excursions for quadrature and in phase components of $\phi$ in Eqs. (9) and (10) are functions of $t_0$, T and A.

$$Q_{pp}(t_0,T, \beta):=4[O_1(t_0,T, \beta)-O_2(t_0,T, \beta)] \tag{20}$$

and $$I_{pp}(t_0,T, \beta):=4[E_1(t_0,T, \beta)-E_2(t_0,T, \beta)] \tag{21}$$

The normalization ratio of $Q_{pp}$ to $I_{pp}$ in Eq. (12) is a function of $t_0$, T and $\beta$:

$$R(t_0, T, \beta) := \frac{Q_{PP}(t_0, T, \beta)}{I_{PP}(t_0, T, \beta)}. \tag{22}$$

Figure 3:
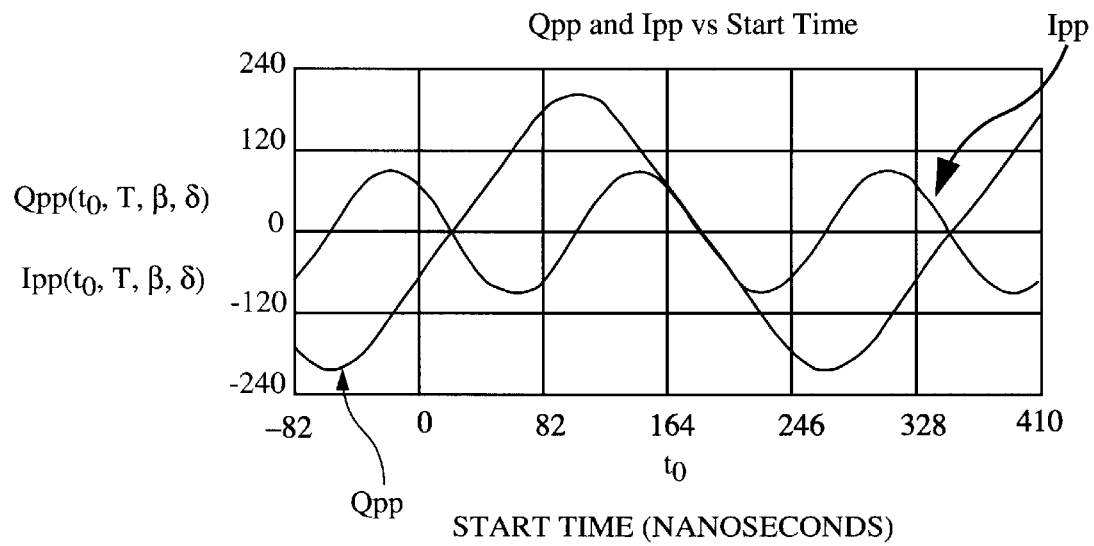
FIG. 3 graphically illustrates amplitudes of quadrature and in phase components of signals output from an interferometric sensor array as functions of the start time at which signal sampling begins for the time interval −82 ns to +410 ns.
Figure 4:
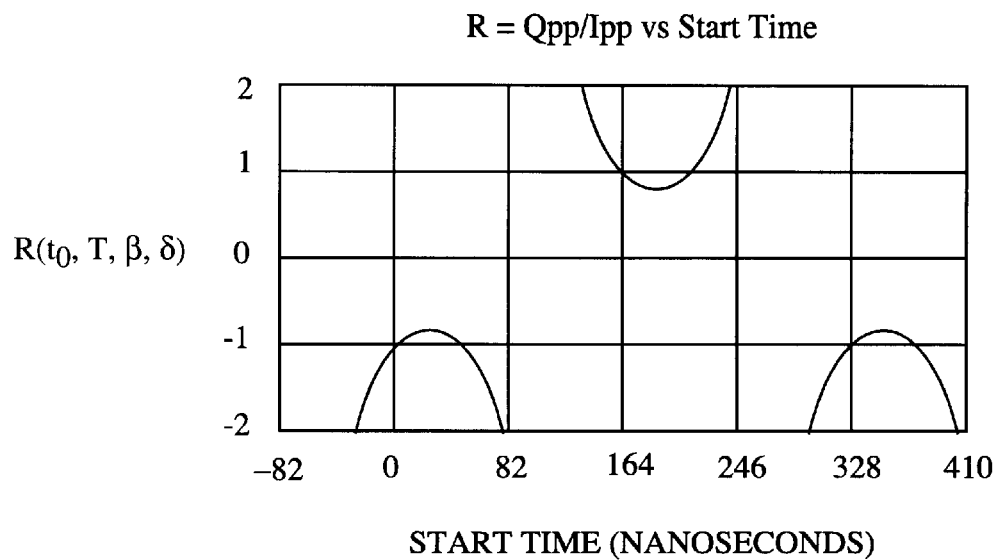
FIG. 4 graphically illustrates the ratio of the quadrature signal component of FIG. 3 to the in phase signal component as functions of the start time from −82 ns to +410 ns.

Plots of $Q_{pp}$, $I_{pp}$ and R are shown in FIGS. 3 and 4. The similarities and differences between FIGS. 2 and 3 should be noted. Three cycles of $I_{pp}$ and one and one half cycles of $Q_{pp}$ shown in FIG. 3 correspond to the three cycles of the even function and one and one half cycles of the odd function shown in FIG. 2.

Figure 5:
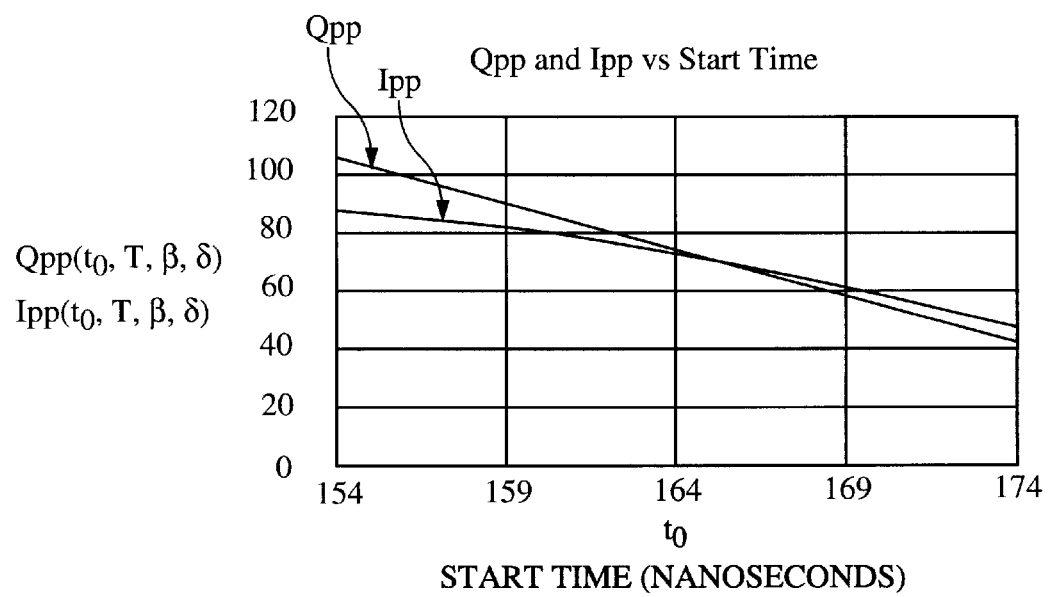
FIG. 5 is a magnified version of FIG. 3 over a reduced start time interval from 154 ns to 174 ns.
Figure 6:
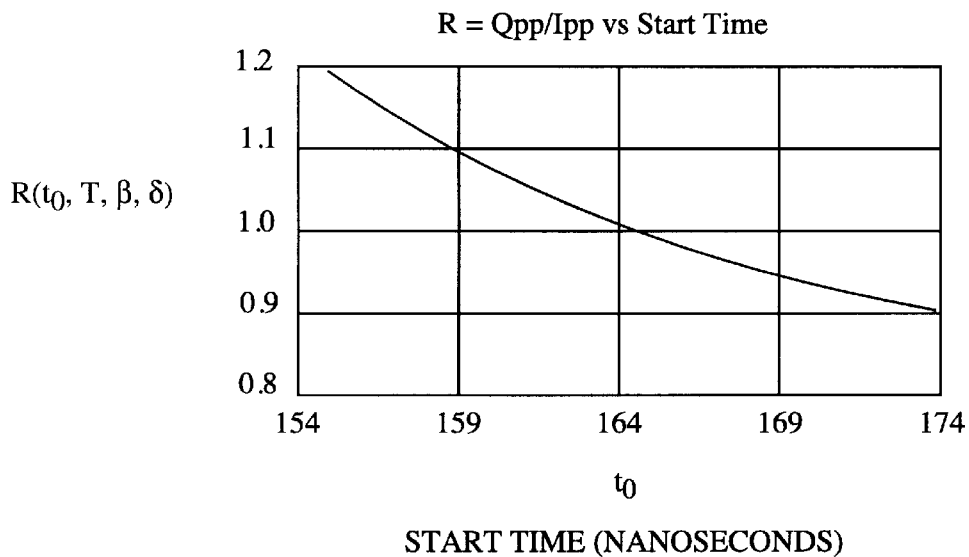
FIG. 6 is a magnified version of FIG. 4 over a reduced start time interval from 154 ns to 174 ns.

As shown in FIGS. 3 and 4, the quantities $Q_{pp}$, $I_{pp}$, and R are functions of start time $t_0$. A suitable start time is based on the following characteristics:

1. Suitable magnitudes for $Q_{pp}$ and $I_{pp}$;
2. Normalization ratio R has a magnitude not too far from unity; and
3. Variation in $t_0$ should not produce excessive variations in R while maintaining sizeable magnitudes for $Q_{pp}$ and $I_{pp}$. Four suitable operating points for to are around 0, 50, 165, and 215 nanoseconds. They are identical to one another apart from sign flips in $Q_{pp}$, $I_{pp}$, and R. Magnified views from 154 to 174 nanoseconds are shown in FIGS. 5 and 6. FIGS. 5 and 6 show the behavior of $Q_{pp}$, $I_{pp}$, and R in a narrower range from 154 to 174 nanoseconds. Over this range $Q_{pp}$ and $I_{pp}$ are more or less equal and the normalization ratio is reasonably close to +1.

The modulation depth $\beta$ has been set to the relatively small value of 1.3 radians to obtain the appropriate characteristics. For an external phase modulator $$\beta = 2\pi\theta_P\left(\frac{\tau}{T}\right) \tag{23}$$

where $\theta_p$ is the zero to peak phase shift for the modulator, $\pi$ is the time delay for the mismatched interferometer sensor, and T is the period of the phase generated carrier. Let the mismatch be two meters yielding a time delay of 10 nanoseconds and let T be 328 nanoseconds as stated before. This gives a zero to peak phase shift of 6.8 radians. With a phase modulator scale factor of one radian per volt, the phase modulator requires a small zero to peak drive voltage of 6.8 volts.

It is desirable to increase the signal levels shown in FIG. 5 and at the same time make the normalization ratio R shown in FIG. 6 as constant as possible over the 20 ns range in start times. Without changing the basic symmetries associated with the odd and even functions shown in FIGS. 2 and 3, a small third harmonic contribution is added to the phase generated carrier. The even and odd functions in Eqs. (14) and (15) become $$e(t, T, \beta, \delta) := \cos\left(\beta\sin\left(\frac{2\pi t}{T}\right) - \delta\sin\left(\frac{6\pi t}{T}\right)\right) \quad (24)$$

and $$o(t, T, \beta, \delta) := \sin\left(\beta\sin\left(\frac{2\pi t}{T}\right) - \delta\sin\left(\frac{6\pi t}{T}\right)\right). \quad (25)$$

Figure 7:
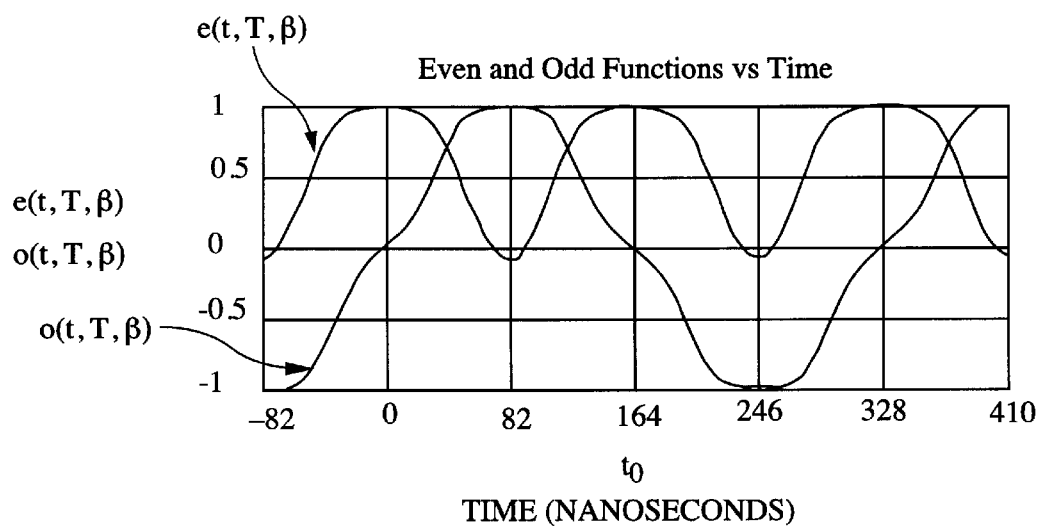
FIG. 7 graphically illustrates time variations of even and odd functions representing the signal output of an interferometric sensor array having a phase generated carrier input signal obtained by modulation of an optical signal with a sinusoid plus its third harmonic.

The modulation depth for the third harmonic term is $\delta$. A plot of these functions is shown in FIG. 7 with $\beta$ set to 1.35 radians and $\delta$ set to 0.3 radians.

As was the case with FIG. 2, three cycles of the even function and one and one half cycles of the odd function are shown. Following the procedure explained above, there are four sampling intervals. Each sampling interval lasts two clock cycles of 32.8 nanoseconds separated from one another by three clock cycles of 49.2 ns. The start time for the first sampling interval is arbitrary. The four integrated outputs $E_1$, $O_1$, $E_2$, and $O_2$ in Eqs. (5) through (8) become $$E_1(t_0, T, \beta, \delta) := \int_{t_0}^{t_0+32.8} e(t, T, \beta, \delta)dt, \quad (26)$$

$$O_1(t_0, T, \beta, \delta) := \int_{t_0}^{t_0+32.8} o(t, T, \beta, \delta)dt, \quad (27)$$

$$E_2(t_0, T, \beta, \delta) := \int_{t_0+82}^{t_0+114.8} e(t, T, \beta, \delta)dt, \quad (28)$$

and $$O_2(t_0, T, \beta, \delta) := \int_{t_0+82}^{t_0+114.8} o(t, T, \beta, \delta)dt. \quad (29)$$

As before, the intervals for $E_2$ and $O_2$ follow the intervals for $E_1$ and $O_1$ by $T/4=82$ ns. Peak to peak excursions for quadrature and in phase components of the phase shift $\phi$ are:

$$Q_{pp}(t_0,T,\beta,\delta):=4[O_0(t_0,T,\beta\delta)-O_2(t_0,T,\beta,\delta)] \quad (30)$$

and $$I_{pp}(t_0,T,\beta,\delta):=4[E_1(t_0,T,\beta\delta)-E_2(t_0,T,\beta,\delta)]. \quad (31)$$

The normalization ratio of $Q_{pp}$ to $I_{pp}$ is $$R(t_0, T, \beta, \delta) := \frac{Q_{PP}(t_0, T, \beta, \delta)}{I_{PP}(t_0, T, \beta, \delta)}. \quad (32)$$

Figure 8:
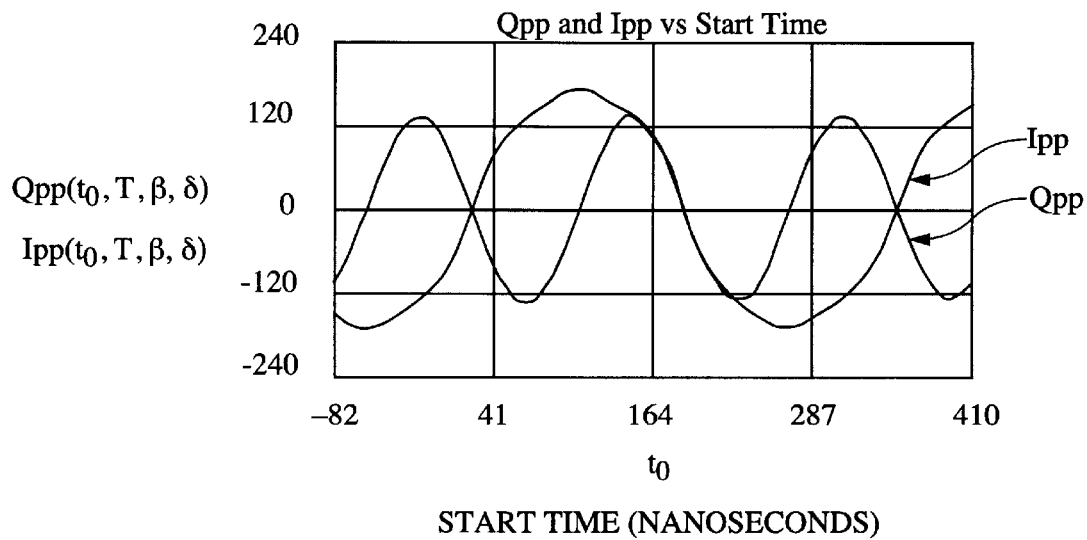
FIG. 8 graphically illustrates amplitudes of quadrature and in phase components of signals output from an interferometric sensor array having a phase generated carrier input signal obtained by modulation of an optical signal with a sinusoid plus its third harmonic for the time interval −82 ns to +410 ns.
Figure 9:
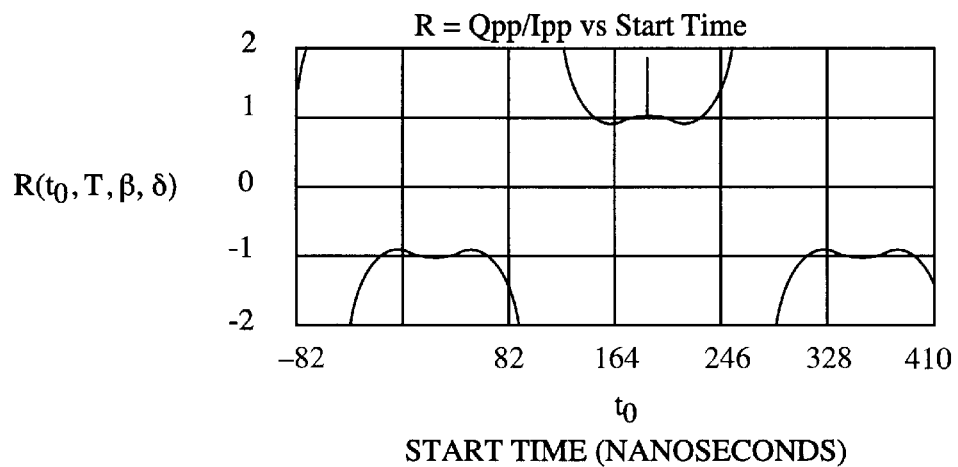
FIG. 9 is a graphical illustration of the ratio of the quadrature signal component of FIG. 8 to the in phase signal component as functions of the start time from −82 ns to +410 ns.
Figure 10:
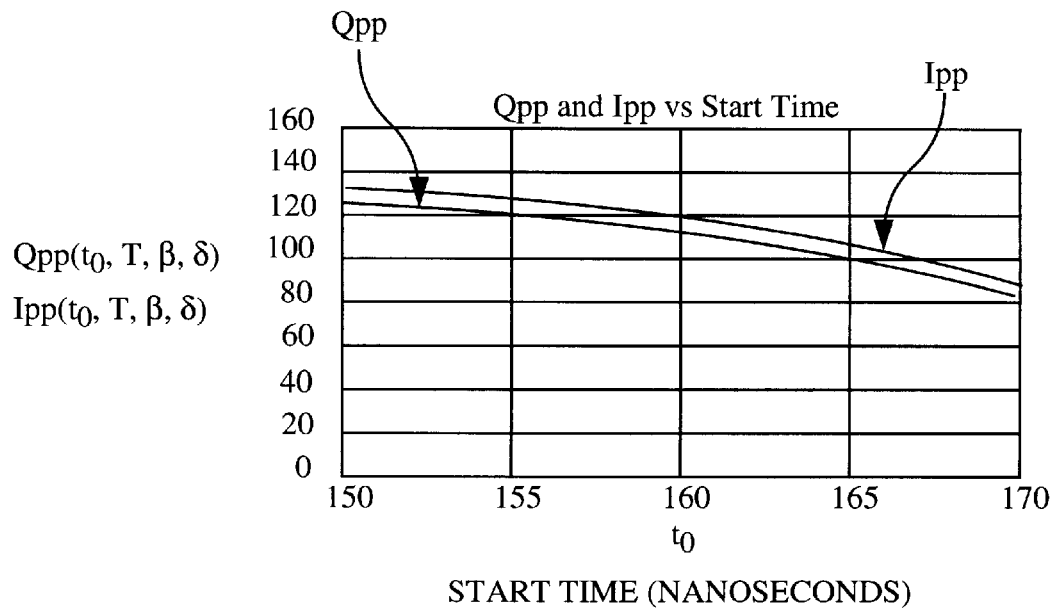
FIG. 10 is a magnified version of FIG. 8 over a reduced start time interval from 154 ns to 174 ns.
Figure 11:
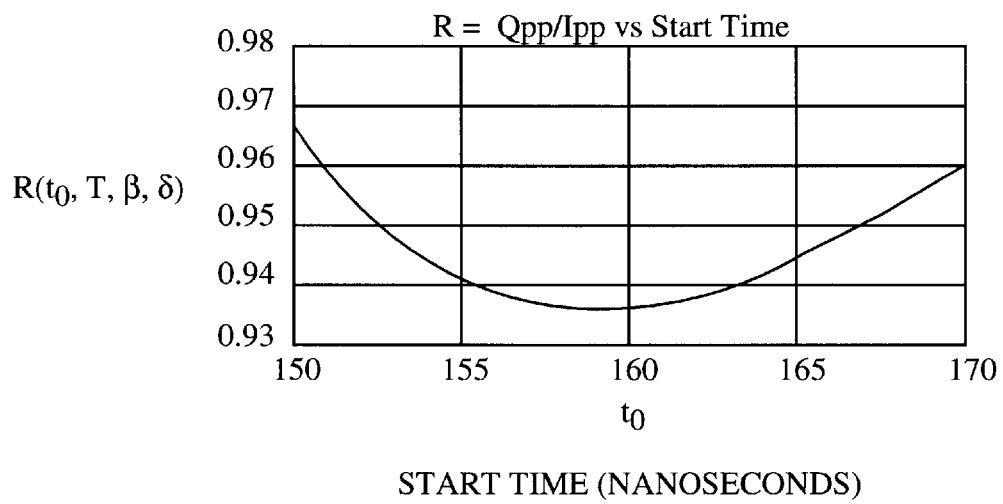
FIG. 11 is a magnified version of FIG. 9 over a reduced start time interval from 154 ns to 174 ns.

Plots of $Q_{pp}$, $I_{pp}$ and R are shown in FIGS. 8–11. FIGS. 8 and 9 are over the entire range of start times, and FIGS. 10 and 11 are magnified views from 150 to 170 ns.

Comparisons are made between FIGS. 5 and 10 and FIGS. 6 and 11 to demonstrate improvements due to the small third harmonic contribution to the phase generated carrier. FIG. 10 shows increases in signal level of 25 to 100% across the 20 nanosecond range of start times for $Q_{pp}$ and $I_{pp}$ and FIG. 10 shows a normalization ratio R that is almost constant across the entire 20 nanoseconds. The fractional variation in R of 30% in FIG. 6 drops to 3% in FIG. 11.

Another source of variation in R is timing jitter. The length of the four sampling intervals and the start time are subject to timing fluctuations in the signal gating. Eight times during one period T the sampling is initiated and terminated. Statistical modeling has been done in which these eight times have added to them a random timing error with a standard deviation of 0.1 nanosecond. The modeling assumes a normal distribution with 4096 samples. This introduces a variation in R with a standard deviation of about 1%.

Figure 12:
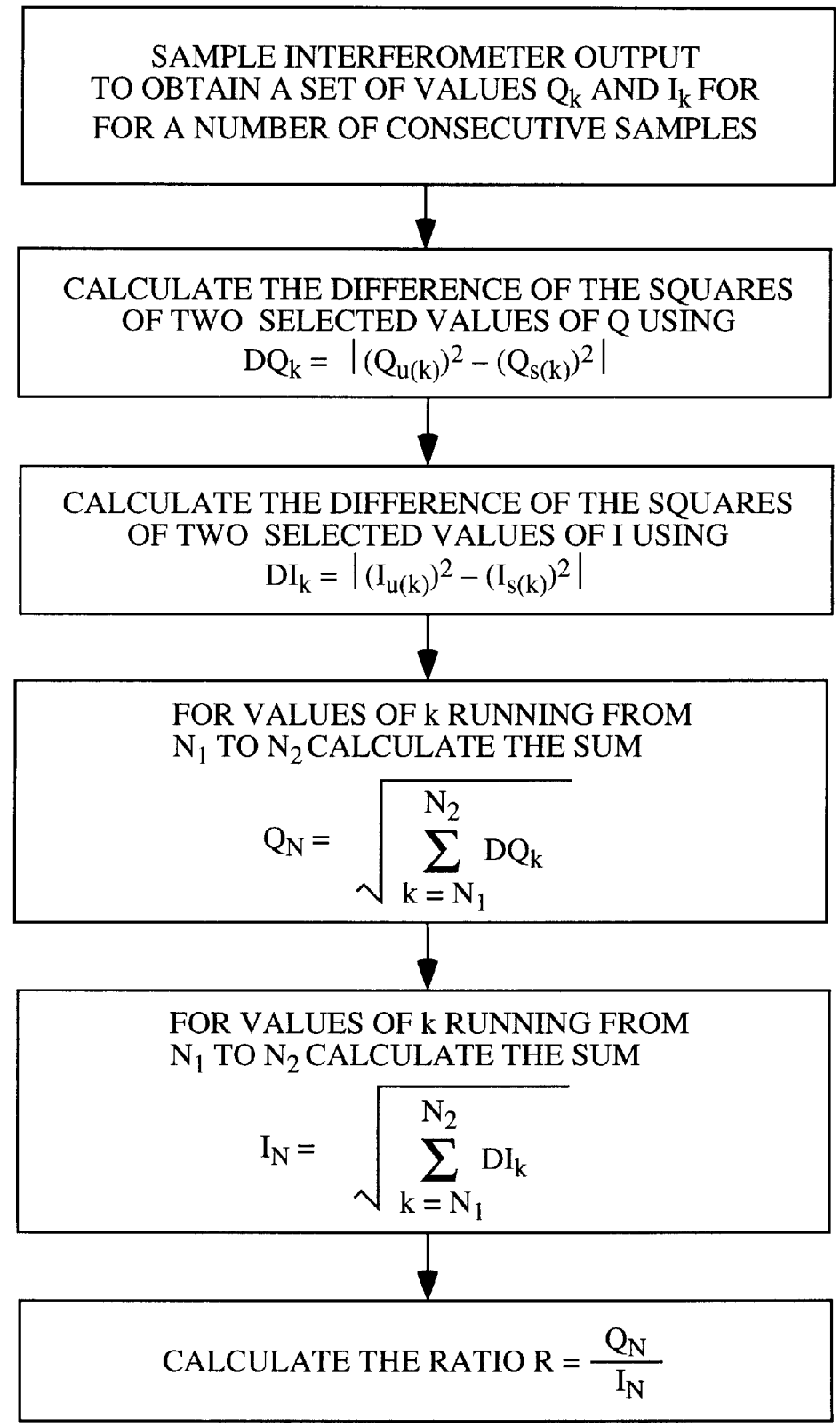
FIG. 12 is a flow diagram illustrating a normalization method that may be used with the demodulation method according to the present invention.

Various techniques may by used to obtain the normalization factor R. A preferred method is disclosed in applicant's United States Patent Application No. 09/309,143, filed May 10, 1999, which is also assigned to Litton Systems, Inc. The disclosure of United States Patent Application No. 09/309, 143 is incorporated by reference. This normalization method is described below with reference to the flow chart of FIG. 12. First, a quantity $DQ_k$ is defined as:

$$DQ_k = |(Q_{u(k)})^2 - (Q_{s(k)})^2| \quad (33)$$

and a quantity Dak is defined as:

$$DI_k = |(I_{u(k)})^2 - (I_{s,(k)})^2|. \quad (34)$$

The index k is a running index of the set of consecutive differences of Q and I. Expressions u(k) and s(k) are used to determine indices that select specific sampled signals. Any Q and I in the sampled data may be used to determine the difference terms $DQ_k$ and $DI_k$. Some examples of u(k) and s(k) are listed below with the constraints $N_1 \leq k \leq N_2$ and $N_1 \geq 0$ where $N_1$ and $N_2$ are integers.

(a) $u(k)=(k+s)^2$ and $s(k)=k^2$, with s being an integer constant.

(b) $u(k)=2^k+(-1)^k$ and $s(k)=N_1$.

(c) $u(k)=u \cdot k+t$ and $s(k)=s \cdot k$, with u, s and t being integer constants.

(d) $u(k)=s \cdot k+t$ and $s(k)=s \cdot k$ with t being the spacing between the signals determined by s·k.

A value is then obtained for $Q_N$ as follows:

$$Q_N = \sqrt{\sum_{k=N_1}^{N_2} DQ_k}. \quad (35)$$

Similarly, a value is obtained for $I_N$:

$$I_N = \sqrt{\sum_{k=N_1}^{N_2} DI_k}. \quad (36)$$

The normalization factor R expressed in EQS. 12, 13, 22 and 32 may then be calculated as:

$$R = \frac{Q_N}{I_N}. \tag{37}$$

Usually only a small percentage of all samples of Q and I need be used. Using the parameters u(k) and s(k) as defined in example (d) above, differences are taken of squared terms t samples apart. Sums of these differences s samples apart are generated in estimating $Q_0/I_0$.

The structures and methods disclosed herein illustrate the principles of the present invention. The invention may be embodied in other specific forms without departing from its spirit or essential characteristics. For example, variation signals input to the sensor array 16 can be produced either directly or indirectly. The direct approach entails a step change in laser source frequency either by modulation of the laser cavity length or by controlled mode hopping. The indirect approach requires the use of the external phase modulator 14. A step change in optical frequency at the output of the phase modulator is produced by means of a linear optical phase ramp over time impressed upon the phase modulator 14.

The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for demodulating signals output from a sensor array that includes a plurality of pathlength mismatched interferometers to determine phase shifts in optical signals that have propagated through the interferometers, comprising the steps of:

providing an optical signal;

modulating the optical signals with a sinusoidal modulation signal to produce a phase generated carrier having a period T;

inputting the phase generated carrier to the sensor array;

producing an output signal that indicates the phase shift for each interferometer in the array;

generating an integrated output signal $S_1$ by integrating the output signal over a first integration time included in the period of the phase generated carrier;

generating an integrated output signal $S_3$ by integrating the output signal over a time equal in duration to the first integration time and 180° apart therefrom in the period of the phase generated carrier;

generating an integrated output signal $S_2$ by integrating the output signal over a second integration time included in the period of the phase generated carrier;

generating a fourth integrated output signal $S_4$ by integrating the output signal over a time equal in duration to the second integration time and 180° apart therefrom in the period of the phase generated carrier; and processing the integrated output signals $S_1$, $S_2$, $S_3$ and $S_4$ to calculate the phase shift $\phi$.

2. The method of claim 1 wherein there is no overlap in the integration times used to obtain the integrated output signals $S_1$, $S_2$, $S_3$ and $S_4$.

3. The method of claim 1 wherein the step of processing the integrated output signals $S_1$, $S_2$, $S_3$ and $S_4$ to calculate the phase angle $\phi$ comprises the steps of:

calculating a value for the quadrature component of the phase shift $\phi$ as $Q=S_1-S_2-S_3+S_4$;

calculating a value for the in phase component of the phase shift $\phi$ as $I=S_1-S_2+S_3-S_4$; and calculating the ratio Q/I of the quadrature term to the in phase term.

4. The method of claim 3 wherein the step of processing the integrated output signals $S_1$, $S_2$, $S_3$ and $S_4$ to calculate the phase angle $\phi$ further comprises the steps of:

determining a numerical value for a normalization factor R that may be used to scale the quadrature and in phase terms to have equal amplitudes by a method that includes the steps of:

sampling the signal output from each sensor in the array to obtain for each sensor a first set of signal terms $Q_k=Q_o B_k \sin \Phi_k$ corresponding to the sine of the phase shift and a second set of signal terms $I_k=I_o B_k \cos \Phi_k$ corresponding to the cosine of the phase shift;

calculating a first quantity $DQ_k=|(Q_{u(k)})^2-(Q_{s(k)})^2|$ and a second quantity $DI_k=|(I_{U(k)})^2-(I_{s(k)})^2|$ where u(k) and s(k) are parameters used to determine indices that select specific sampled signals and k is a running index of the set of consecutive samples of Q and I;

calculating a quantity $$Q_N = \sqrt{\sum_{k=N_1}^{N_2} DQ_k} \; ;$$

calculating a quantity $$I_N = \sqrt{\sum_{k=N_1}^{N_2} DI_k} \; ;$$

calculating the normalization ratio $R=Q_N/I_N$; and determining the phase angle $\phi$ by determining the arctangent of $$\tan\varphi = \left[\frac{1}{R}\right]\left[\frac{Q}{I}\right].$$

5. The method of claim 1 wherein the step of processing the integrated output signals $S_1$, $S_2$, $S_3$ and $S_4$ to calculate the phase angle further comprises the steps of adding a third harmonic component to the sinusoidal modulation signal to reduce variations in the normalization ratio.

6. The method of claim 1, further including the step of selecting a start time for signal sampling such that the quadrature term Q and the in phase term I have approximately equal magnitudes with minimum sensitivity to variation in start time.

* * * * *